Dec. 19, 1939.  O. V. PAYNE  2,184,058
SHUTTLE CHECK FOR LOOMS
Filed Feb. 3, 1939  2 Sheets-Sheet 1
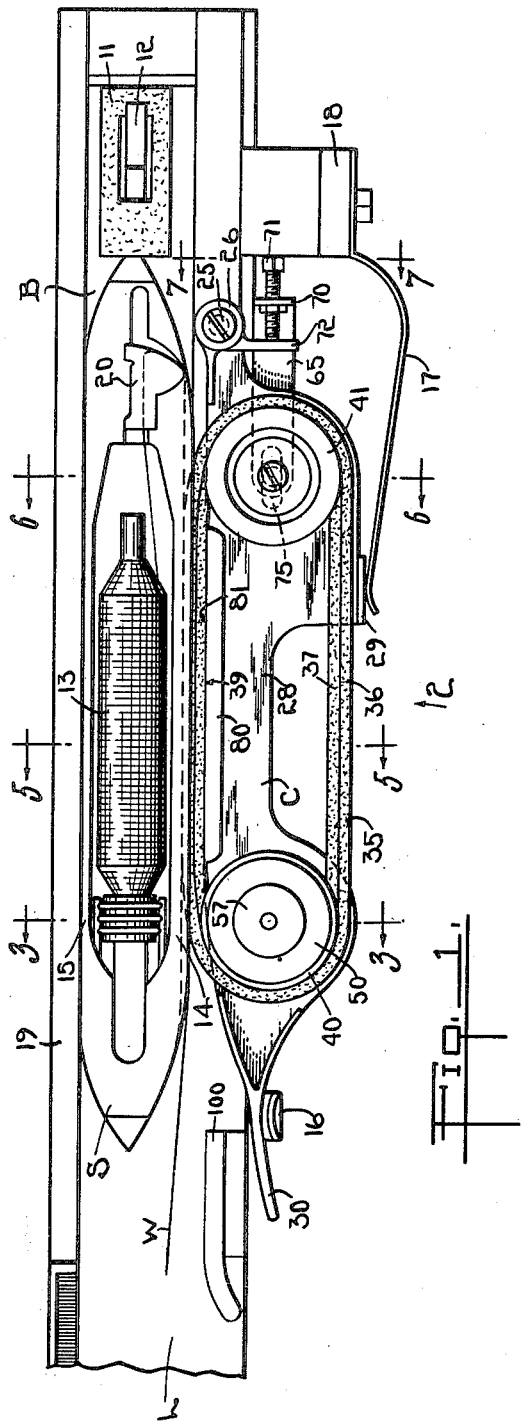
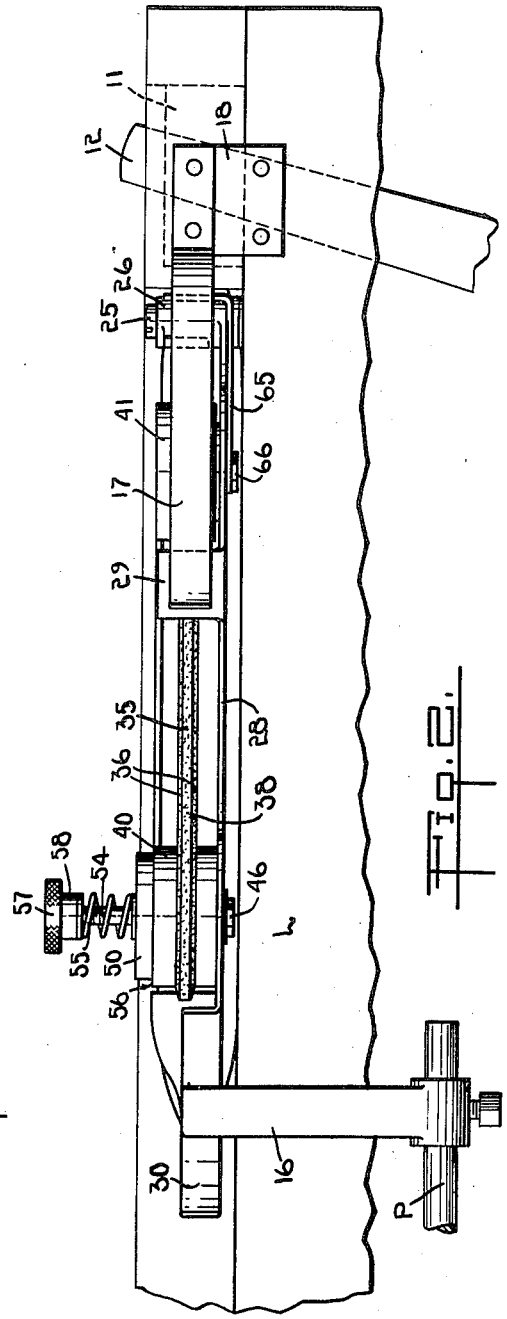
Fig. 1.
Fig. 2.
Inventor
Oscar V. Payne
By Chas. P. Hawley
Attorney

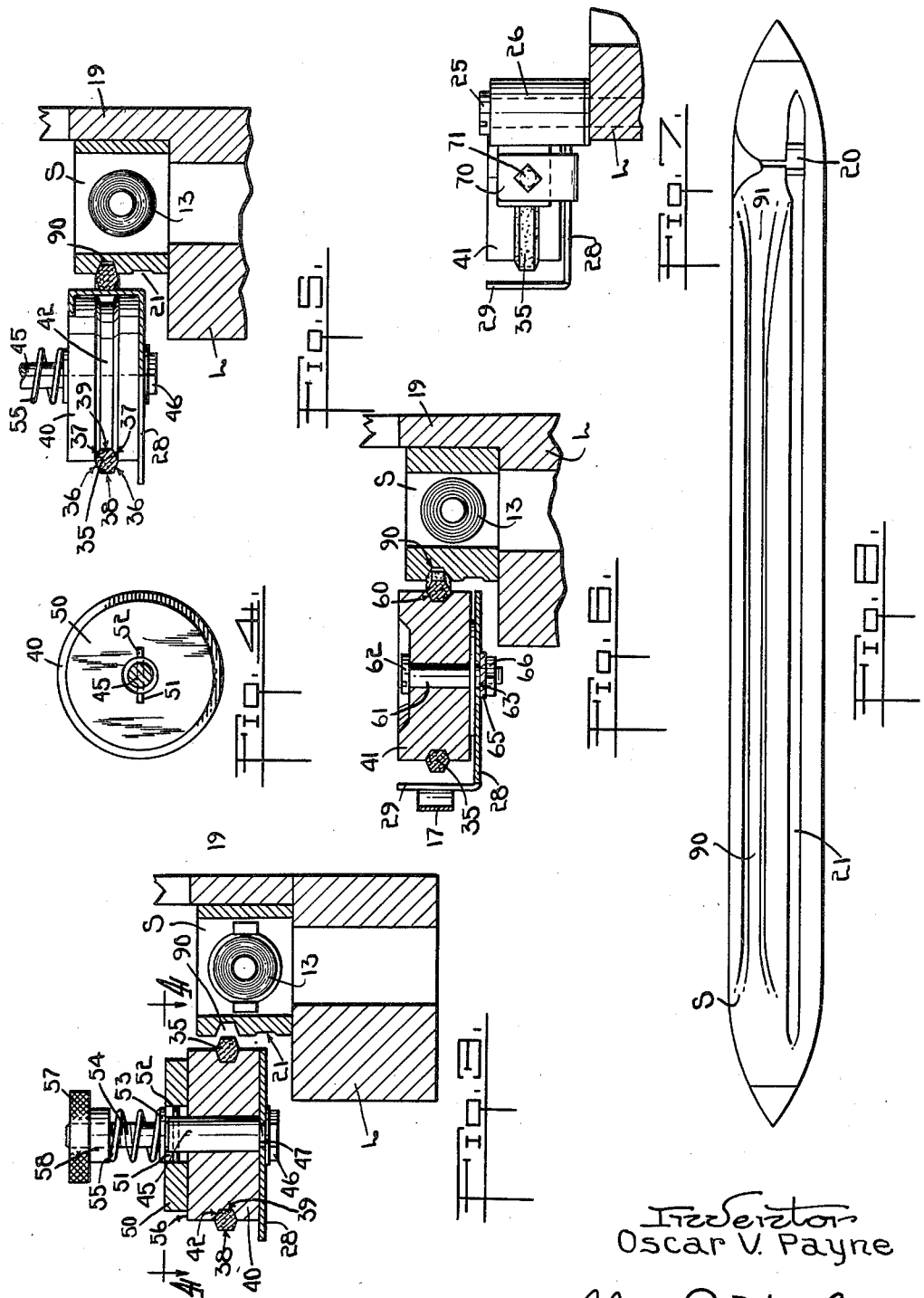

Patented Dec. 19, 1939

2,184,058

UNITED STATES PATENT OFFICE 2,184,058

SHUTTLE CHECK FOR LOOMS

Oscar V. Payne, Leicester, Mass., assignor to Crompton & Knowles Loom Works, Worcester, Mass., a corporation of Massachusetts Application February 3, 1939, Serial No. 254,389

12 Claims. (Cl. 139—185)

This invention relates to improvements in shuttle checks for looms and it is the general object of the invention to provide a travelling surface to move with the shuttle as the latter is boxed together with means for resisting motion of the travelling member.

In the usual form of shuttle check the retarding force is transmitted to the shuttle by friction developed as a result of relative motion between the shuttle and the checking part. Because of this condition the force of checking is limited to that which can be applied directly to the shuttle and any change in the friction relation between the shuttle and the part engaging it due for instance to variations in temperature are reflected in varying checking effects. I have already proposed in Patent No. 2,012,050 a form of check in which the resisting force is transmitted by a shuttle engaging part to a friction device out of contact with the shuttle and therefore not subject to variation due to changing conditions of the shuttle. In that patent I provided a belt moving around sheaves rotating on axes fixed to the lay and also used a belt the flat side of which engages a wall of the shuttle.

It is an important object of my present invention to mount the belt and the sheaves therefor on a binder pivoted to the lay in such a way that the belt can project into the path of the shuttle to insure close contact therewith and then move outwardly to maintain this contact as the shuttle continues to move in the box. In this way I am able to secure an increased frictional contact between the belt and the shuttle of such magnitude as to prevent any substantial slippage between the belt and the shuttle, thereby requiring the belt to move with the shuttle. This feature is used in conjunction with a friction means to retard the belt, one form of which as shown hereinafter is a friction disk to be applied directly to one of the sheaves.

In the aforesaid patent the belt is of the V-type so placed that the flat side engages the shuttle. It is a further object of my present invention to modify the belt engaging wall of the shuttle by forming therein a V-shaped groove to receive and have contact with the inclined walls of a double V-belt. This reversal of the belt insures sufficient holding relation between the shuttle and the belt to prevent slippage of these two parts and insure transmission of practically all the checking force of the shuttle to the friction device.

It is a further object of my invention to provide an improved shuttle having a wall formed with a groove having inclined sides to engage the checking belt. Heretofore, the belt has engaged a flat shuttle wall, but in the present instance I provide a wedging relation between the shuttle and the belt.

As a matter of practical convenience I provide means for varying the friction resistance which is applied to the sheave and may also provide means for varying the amount of friction between the belt and the sheave as by changing the position between the sheaves to tighten or loosen the belt.

With these and other objects in view which will appear as the description proceeds, my invention resides in the combination and arrangement of parts hereinafter described and set forth.

In the accompanying drawings, wherein a convenient embodiment of my invention is set forth, Fig. 1 is a plan view of an end of a lay having my invention applied thereto, Fig. 2 is a front elevation of the structure shown in Fig. 1 looking in the direction of arrow 2, Fig. 3 is a vertical section on line 3—3 of Fig. 1, Fig. 4 is a horizontal section on line 4—4 of Fig. 3, Figs. 5, 6 and 7 are vertical sections on line 5—5, 6—6 and 7—7, respectively, of Fig. 1, and Fig. 8 is a front elevation of a shuttle constructed for use with my present invention.

Referring to the drawings, particularly Figs. 1 and 2, I have shown a lay L having a shuttle box B containing a shuttle S to be propelled out of the box by a picker 11 actuated by a picker stick 12 in usual manner. The shuttle chosen to illustrate the invention is of the automatic bobbin changing type having a bobbin 13 therein located between front and back shuttle walls 14 and 15, respectively. A protector finger 16 may be mounted in the usual manner on a protector rod P, and a binder spring 17 may be mounted as at 18 on the lay for cooperation with the binder designated generally at C. The parts thus far described are of the usual construction except for modifications to be set forth hereinafter and operate in the usual way, the shuttle entering the box from the left at the end of a flight to slide along a box back 19 toward the picker 11.

The shuttle has an eye 20 from which leads the weft thread W, and as shown in Fig. 8 may have the usual thread slot 21 in its front wall to receive the weft thread. In certain uses of my invention the thread slot 21 may not be necessary but I have shown it herein as a part of the usual construction of the front wall of the shuttle.

In carrying my present invention into effect I mount the binder C pivotally with respect to the lay in a manner similar to the usual binders. Accordingly, I provide a pivot pin 25 fastened to the lay to receive a hub 26 on the binder. The latter has a flat horizontal plate 28, preferably of sheet metal, to which the hub 26 is secured and a part of this plate is bent upwardly as at 29 to receive the rearward thrust of the binder spring 17. The left end of the plate 28 is shaped as indicated in Figs. 1 and 2 to provide a tip 30 extending behind the protector finger 16, as clearly shown in Fig. 1. The effect of spring 17 is to turn the binder in a clockwise direction as viewed in Fig. 1 about the pivot pin 25 to hold the binder normally rearwardly in a shuttle checking position, while the forward or opposite angular motion of the binder in a direction away from the shuttle box back 19 will move the protector finger 16 forwardly to prevent operation of the protecting mechanism not shown in the usual manner.

The shuttle checking surface is provided by an endless belt 35 which may be of the double V-type or of hexagonal cross section as shown for instance in Fig. 5. The belt will have a pair of outer inclined surfaces 36 and another pair of similarly beveled or inclined surfaces 37 on the inner side thereof. The belt may conveniently have outer and inner vertical surfaces 38 and 39, respectively.

As shown in Fig. 1 the belt is trained around inner and outer sheaves 40 and 41, respectively, which are rotatably supported on the binder. The inner sheave 40 at the left of Fig. 1 is provided with a belted groove 42 which receives the inner inclined surfaces 37 of the belt. Sheave 40 is mounted for rotation on a stud 45 the lower end of which is secured to the plate 28 by being threaded therethrough and held by a nut 46 which draws a shoulder 47 of the stud against the top of plate 28, as shown in Fig. 3. By this construction the stud 45 is stationary on the binder and the sheave 40 is rotatable thereon, resting on and having friction contact on the under side thereof with the plate 28.

In order that rotation of the sheave 40 may be resisted for the purpose of checking the shuttle through the belt, I provide a friction disk 50 surrounding stud 45 and having a slot 51 to receive a pin 52 passing through and secured to the stud 45. A washer 53 through which passes a reduced part 54 of the stud 45 rests on disk 50 and receives the downward thrust of a compression spring 55 which forces disk 50 onto the top surface 56 of sheave 40. Washer 53 may be omitted if desired. A knurled thumb screw 57 is threaded on the upper part of the stud and has a hub 58 bearing against the top of the spring 55. By turning the nut 57 on the stud the pressure of spring 55 and therefore frictional resistance offered to rotation of sheave 40 can be varied.

The outer disk 41 at the right of Fig. 1 is also provided with a beveled groove 60 whch receives the surfaces 37 of the belt. This outer sheave rotates freely on a stud 61 having a head 62 to limit upward motion of the sheave 41, see Fig. 6. The lower end of stud 60 is reduced to form shoulder 63 and threaded into a carrier 65 and is held in fixed position on the carrier by a nut 66. As shown in Fig. 1 the carrier 65 has the right end thereof bent upwardly as at 70 to receive an adjustable positioning screw 71 the left end of which engages a finger 72 extending from hub 26. The stud 61 passes through an elongated slot 75 in the plate 28 which permits relative motion of the sheave 41 with respect to the plate in a direction toward and from the inner sheave 40. When it is desired to tighten the belt the screw 71 is turned in such a direction as to draw the carrier 65 and therefore the sheave 41 to the right as viewed in Fig. 1 away from sheave 40, the effect of which will be to increase the tension in the belt and its frictional engagement with sheave 40.

Extending upwardly from plate 28 is a guide 80 along the rear part of which the inner surface 39 of the belt extends. The rear surface 81 of guide 80 may be and preferably is behind a line tangent to the bottoms of grooves 42 and 60 in sheaves 40 and 41, respectively. By this relation the rear parts of the belt which extend from the sheaves toward the guide are inclined with respect to the front shuttle wall. This feature, shown in Fig. 1 is of more particular value at the entering end of the shuttle box adjacent the sheave 40. By means of this inclination the rear outer surface of the belt is oblique to facilitate entry of the shuttle into the box by a gradual motion and also to prevent the shuttle from striking the sheave 40 an undesirably hard blow as the shuttle is boxed.

The shuttle has a longitudinally extending beveled groove 90 in the upper part of its front wall as shown for instance in Figs. 3 and 8. The walls of this groove are shaped to conform to the part of the belt with which they cooperate and it will be seen that the groove 90 is above the thread groove 21 so that the shuttle checking mechanism does not interfere with the thread W.

In operation and with the shuttle box empty spring 17 will move the binder rearwardly toward the box back to position the strap in the path of the incoming shuttle. A stop 100 limits the rearward motion of the binder. As the shuttle enters the box the flared end 91 of the groove as shown in Fig. 8 will approach the beveled rear part of the belt to be entered by the latter and the binder will move out against the action of binder spring 17 as is customary in the ordinary binder. As the shuttle continues to enter the box its frictional contact with the belt will increase because of the increasing area of contact between the belt and the groove 90 and before the shuttle has traveled very far in the box this friction will be sufficient to start the belt turning in a clockwise direction as viewed in Fig. 1, causing rotation of the sheaves 40 and 41.

The belt is preferably made of a material which offers high resistance to slipping in both the groove 90 of the shuttle and the beveled grooves of the sheaves, particularly the groove of the sheave 40. I have found in practice that a belt made of rubberized fabric such as is commonly used in the driving gear of machines having V-shaped pulleys will adhere to the shuttle and in turn will move the sheave 40. Movement of the latter is resisted by the disk 50 which presses the bottom of sheave 40 down against the plate 28. The sheave 40 is therefore pressed between two surfaces and its tendency to rotate is resisted by a force varying with the compression of the spring 55.

It is important to note that the belt and shuttle cooperate in such a way that the shuttle moves the belt longitudinally of the shuttle box during the greater part of shuttle boxing and also that the belt in turn causes rotation of sheave 40 against the action of the friction disk 50. By this relationship the frictional resistance offered by the relative sliding of one surface against another is removed entirely from the shuttle and dissipated at a point which is readily accessible to the weaver by reason of the knurled nut 57. Furthermore, the material of which the disk and sheave 40 are made can be selected for best frictional cooperation, the choice of materials being wider than that ordinarily permissible with the ordinary type of shuttle checks when it is remembered that most shuttles are made of wood.

It will be observed from Fig. 1 that the upright guide 80 along which the rear part of the belt slides will offer some frictional resistance to the belt. The relationship of the various resistances is such that the combined resistance offered to rotation of the sheave 40 plus the resistance offered by guide 80 to the belt will be less than the frictional resistance between the shuttle and the belt. The inclined surfaces of the belt and walls of the groove in the shuttle insure a close contact between the belt and the shuttle and give assurance that the belt will be moved along the shuttle box by a force derived from the incoming shuttle sufficient to overcome the different resistances offered to motion of the belt. The important function of the guide 80 is to render that portion of the rear part of the belt which is near the box mouth oblique with respect to the path of the shuttle to permit a gradual increase in the friction between the shuttle and the belt and also spare the sheave 40 of any shock which it might receive were the shuttle to engage that part of the belt which is in contact with the sheave.

From the foregoing it will be seen that I have provided an improved shuttle binder having a travelling surface to move with the shuttle and be retarded or resisted by means carried on the binder. It will further be seen that the tension of the belt can be varied by altering the distance between the sheaves 40 and 41 for the purpose of changing the frictional contact between the belt and the sheave 40. Furthermore, it will be seen that the guide 80 serves not only to add frictional resistance to motion of the belt but also renders a portion of the latter oblique with respect to the path of the shuttle to facilitate entry of the shuttle into the shuttle box. All of the parts having any effect on the operation of the belt are carried by the binder and when the latter moves about its pivot the relation of these parts remains unchanged by the pivotal motion of the binder. It will also be seen that the belt is made of the double V-type to insure close contact not only with the groove in the shuttle but also with the tapered groove in the sheave 40. It will also be seen that I have provided a new shuttle having a belt receiving groove the walls of which are inclined to establish tight holding relation with the similarly inclined surfaces of the belt.

Having thus described my invention it will be seen that changes and modifications may be made therein by those skilled in the art without departing from the spirit and scope of the invention and I do not wish to be limited to the details herein disclosed, but what I claim is:

1. A shuttle binder having a body with a bore to receive a pivot, a pair of spaced journals supported by the body, a rotary element on each journal, an endless belt supported by and frictionally engaging and moving with the elements and having a portion thereof extending along the length of the body, means supported by the body to resist rotation of one of the rotary elements, and means to vary the distance between the spaced journals to change the frictional resistance between the belt and said one rotary element.

2. In a loom binder, a body having a bore for pivotal support thereof, a pair of rotary elements mounted on the binder, means to resist rotation of one of said elements relative to the binder, an endless belt trained around said rotary elements, and a belt guide carried by and extending along one side of the binder to engage a part of the belt and cause the latter to extend from the guide to the rotary element rotation of which is resisted in a direction which is oblique with respect to the length of the guide.

3. In a loom having a lay with a shuttle box at one end thereof, a binder pivoted to the lay and forming one part of the shuttle box, an endless belt supported by the binder, rotary elements on the binder around which the belt is trained, the belt having frictional contact with one of said rotary elements, resisting means to oppose rotation of said one element relatively to the binder, a belt guide extending along that part of the belt which lies along one side of the shuttle box and being in front of said belt to have frictional contact therewith, a shuttle entering the shuttle box engaging said part of the belt and having frictional contact therewith to move the belt along the shuttle box, the combined frictional resistance offered to motion of the belt by said guide and the resisting means acting through said rotary element being less than the resistance to relative motion between the belt and the shuttle, whereby the shuttle as the same enters the box will cause motion of the belt to overcome the resistance offered to motion of the belt relatively to the binder.

4. In a loom having a lay with a shuttle box to receive a shuttle, a binder pivoted to the lay, a journal on the binder, a rotatable element on the journal, friction means carried by the binder to resist rotation of the element around the journal, and a belt extending along and forming part of the shuttle box to be engaged and moved by the shuttle as the latter enters the box to cause rotation of the element, the rotatable element and friction means movable with the binder for all positions of the latter with respect to the lay.

5. In a loom having a lay with a shuttle box to receive a shuttle, a binder pivoted to the lay, a journal supported by the binder, a rotatable element on the journal, a belt engaging the element and extending along and forming part of the shuttle box, friction means carried by the binder to resist rotation of the element, and means to hold the binder in the path of the shuttle as the latter enters the shuttle box to cause the shuttle to engage the belt, the belt movable longitudinally of the box by the shuttle as the latter enters the box and causing rotation of the element against said friction means to check the shuttle.

6. In a loom having a lay with a shuttle box at one end thereof, a shuttle to enter the shuttle box and having a friction surface extending longitudinally of the lay, a binder pivoted to the lay and extending along and forming one side of the shuttle box, a belt supported by the binder and having a friction surface to engage the said frictional surface of the shuttle, rotary guides for the belt mounted on and rotatable relatively to the binder, and means to resist rotation of one of the guides with respect to the binder, the frictional surface of the shuttle when the latter enters the box engaging the friction surface of the belt and moving the latter longitudinally of the lay to cause rotation of said one rotary guide against the action of the resisting means.

7. In a loom having a lay and shuttle box at one end thereof, a shuttle to enter the shuttle box and having a groove extending longitudinally along a wall thereof, a binder mounted on the lay for movement relatively thereto, a belt supported by the binder, supporting means for the belt mounted on the binder for movement relatively to the latter, and means to resist movement of the supporting means relatively to the binder, the belt to enter the groove in the shuttle as the latter enters the box and have frictional contact with the shuttle sufficient to cause movement of the supporting means relatively to the binder against the action of the resisting means to check the shuttle.

8. In a loom having a lay and a shuttle box at one end thereof, a shuttle having a groove with inclined walls therein, a binder pivoted to the lay and extending along one side of the shuttle box, an endless belt supported by the binder and positioned to enter the groove of the shuttle as the latter enters the box, supporting sheaves for the belt mounted on the binder and rotatable relatively thereto by motion of the belt along the shuttle box longitudinally of the lay, and means to resist rotation of one of the sheaves relatively to the binder, the belt to enter the groove in the shuttle and shaped to have frictional contact with the inclined walls of the groove, said contact being sufficient to cause said belt to move longitudinally of the lay and thereby cause rotation of the sheaves relatively to the binder by a force derived from the shuttle and transmitted through the belt.

9. In a loom having a shuttle box, a binder pivotally mounted with respect to the box and extending therealong to form one side thereof, an endless belt supported by the binder and having a part to extend along and form part of the shuttle box, rotary sheaves for the belt mounted on the binder, means to resist rotation of one of said sheaves with respect to the binder, and a guide on the binder for said part of the belt, along which said part moves, said guide being located to cause the portions of the aforesaid part of the belt extending from the sheaves toward said guide to be oblique with respect to the shuttle box, a shuttle entering the shuttle box engaging one of said oblique parts of the belt and establishing frictional contact with said part of the belt to move the latter along the guide and cause rotation of said one sheave.

10. In a loom having a lay with a shuttle box at one end thereof, a binder for the shuttle box pivoted to the lay, an endless belt supported by the binder and moving therewith, a pair of spaced rotary elements around which the belt is trained, said rotary elements supported by and movable with respect to the binder, means to resist rotation of one of the rotary elements with respect to the binder, and a guide for that part of the belt which extends along and forms part of the shuttle box, said guide having frictional contact with the aforesaid part of the belt and being so placed as to cause that portion of said part of the belt which extends from the guide toward the rotary element which is adjacent the shuttle entering end of the shuttle box to be oblique with respect to the lay in a direction from said guide forwardly and toward the center of the loom, a shuttle when entering the box engaging said oblique portion of the belt and having frictional engagement thereof to cause movement of the belt in a direction along the lay, motion of the belt being resisted by frictional contact with said guide and also by the resistance offered to said rotary element by said resisting means.

11. In a shuttle for a loom having a travelling belt to engage and check the shuttle, said shuttle having a wall provided with a longitudinally extending groove to receive the belt, the ends of the groove being enlarged to facilitate entry of the belt into the groove.

12. In a shuttle for a loom having a travelling belt with inclined surfaces to engage and check a shuttle, said shuttle having a longitudinal groove therein with inclined walls to engage the inclined surfaces of the belt as the latter enters the groove.

OSCAR V. PAYNE.